United States Patent
Hsiao

(10) Patent No.: US 10,025,945 B2
(45) Date of Patent: Jul. 17, 2018

(54) DECRYPTION METHOD FOR USE IN DISPLAYING DATA

(71) Applicant: Getac Technology Corporation, Hsinchu County (TW)

(72) Inventor: Wei-Chung Hsiao, Taipei (TW)

(73) Assignee: GETAC TECHNOLOGY CORPORATION, Hsinchu County (TW)

(*) Notice: Subject to any disclaimer, the term of this patent is extended or adjusted under 35 U.S.C. 154(b) by 164 days.

(21) Appl. No.: 14/834,000

(22) Filed: Aug. 24, 2015

(65) Prior Publication Data

US 2016/0314304 A1 Oct. 27, 2016

(30) Foreign Application Priority Data

Apr. 24, 2015 (CN) .......................... 2015 1 0200494

(51) Int. Cl.
*G06F 21/62* (2013.01)
*G06F 21/60* (2013.01)

(52) U.S. Cl.
CPC ................. *G06F 21/6218* (2013.01)

(58) Field of Classification Search
CPC ................. G06F 21/62; G06F 21/31
USPC .......................................................... 713/183
See application file for complete search history.

(56) References Cited

U.S. PATENT DOCUMENTS

| | | | | |
|---|---|---|---|---|
| 5,544,360 A * | 8/1996 | Lewak | | G06F 17/30126 |
| 8,613,047 B2 * | 12/2013 | Chen | | G06F 21/316 |
| | | | | 726/16 |
| 9,076,008 B1 * | 7/2015 | Moy | | G06F 21/60 |
| 9,165,128 B1 * | 10/2015 | Daniel | | G06F 21/6218 |
| 9,348,897 B2 * | 5/2016 | Shoham | | G06Q 10/109 |
| 9,536,126 B2 * | 1/2017 | Yoon | | G06F 3/0486 |
| 9,723,000 B1 * | 8/2017 | Daniel | | H04L 63/0861 |
| 2002/0161756 A1 * | 10/2002 | Fesq | | G06Q 10/10 |
| 2006/0168658 A1 * | 7/2006 | Kallio | | G06F 12/1458 |
| | | | | 726/21 |
| 2007/0074043 A1 * | 3/2007 | Lacey | | G06F 19/323 |
| | | | | 713/186 |
| 2013/0283387 A1 * | 10/2013 | Wang | | G06F 21/6209 |
| | | | | 726/26 |
| 2014/0040716 A1 * | 2/2014 | Lin | | G06F 17/2235 |
| | | | | 715/205 |

(Continued)

*Primary Examiner* — Morshed Mehedi
*Assistant Examiner* — Dereena T Cattungal
(74) *Attorney, Agent, or Firm* — Locke Lord LLP; Tim Tingkang Xia, Esq.

(57) ABSTRACT

A decryption method for use in displaying data includes the steps of executing a display instruction of an object inclusive of a plurality of data, displaying an unencrypted data, but not an encrypted data, of the data on a display unit according to the display instruction, detecting a trigger signal during the state of displaying the unencrypted data but not displaying the encrypted data, entering a password-receiving state in response to the trigger signal and detecting a password signal during the password-receiving state, determining whether the password signal matches a default password, and displaying the unencrypted data and the encrypted data on the display unit when the password signal matches the default password. Therefore, with the decryption method, no person other than the object owner is aware of the encrypted data.

17 Claims, 12 Drawing Sheets

(56) References Cited

U.S. PATENT DOCUMENTS

| | | | |
|---|---|---|---|
| 2014/0333528 A1* | 11/2014 | Murata | G06F 3/04855 |
| | | | 345/156 |
| 2014/0351928 A1* | 11/2014 | McKeeth | G06F 21/31 |
| | | | 726/19 |
| 2015/0205993 A1* | 7/2015 | Han | G06K 9/00013 |
| | | | 345/173 |
| 2016/0241530 A1* | 8/2016 | Andreev | H04L 51/12 |
| 2016/0269376 A1* | 9/2016 | Goyal | H04L 63/0492 |
| 2016/0314292 A1* | 10/2016 | Zheng | G06F 21/51 |

* cited by examiner

|   | Full Name | Date of Birth | Address |
|---|---|---|---|
| 1 | Chang XX | 1976/02/27 | No. XX, Haoshou, Fengshou Village, Minxiong Township, Chiayi County |
| 2 | Lee CC | 1989/03/15 | No. XX, Xiangteng Mansion, Zaoqiao Village, Zaoqiao Township, Miaoli County |
| 3 | Wang OO | 1967/04/12 | No. 1 Sec. 1, Zhongxiao E. Rd., Taipei City |
| 4 | Du EE | 1981/12/16 | No. 156, Sanyuan St., Taoyuan City, Taoyuan County |
| 5 | Chen LL | 1977/11/05 | No. 1, City Hall Rd., Xinyi District, Taipei City |
| 6 | Zheng WW | 1964/10/07 | 1F, No. 28, Sec. 2, Xinsheng N. Rd., Taipei City |
| 7 | Yang AA | 1976/11/22 | 2F, No. 157, Hanzhong St., Wanhua District, Taipei City |
| 8 | Liao QQ | 1981/09/25 | 1F, No. 6-60, Dongshi St., Nuannuan District, Keelung City |

FIG.3

| | Full Name | Date of Birth | Address |
|---|---|---|---|
| 1 | Chang XX | 1976/02/27 | No. XX, Haoshou, Fengshou Village, Minxiong Township, Chiayi County |
| 2 | Lee CC | 1989/03/15 | No. XX, Xiangteng Mansion, Zaoqiao Village, Zaoqiao Township, Miaoli County |
| 3 | Wang OO | 1967/04/12 | Enter Password : ********* |
| 4 | Du EE | 1981/12/16 | |
| 5 | Chen LL | 1977/11/05 | No. 1, City Hall Rd., Xinyi District, Taipei City |
| 6 | Zheng WW | 1964/10/07 | 1F, No. 28, Sec. 2, Xinsheng N. Rd., Taipei City |
| 7 | Yang AA | 1976/11/22 | 2F, No. 157, Hanzhong St., Wanhua District, Taipei City |
| 8 | Liao QQ | 1981/09/25 | 1F, No. 6-60, Dongshi St., Nuannuan District, Keelung City |

FIG.5

DECRYPTION METHOD FOR USE IN DISPLAYING DATA

CROSS-REFERENCE TO RELATED APPLICATIONS

This non-provisional application claims priority under 35 U.S.C. § 119(a) on Patent Application No(s). 201510200494.2 filed in China on Apr. 24, 2015, the entire contents of which are hereby incorporated by reference.

BACKGROUND OF THE INVENTION

Field of the Invention

The present invention relates to decryption methods for use in displaying data, and more particularly, to a decryption method for use in displaying hidden data.

Description of the Prior Art

With information digitalization technology and electronic products being increasingly advanced, a wide variety of digital data are stored in various electronic products, and in consequence users' demand for effective confidentiality and efficient decryption of data is ever-increasing.

To meet the increasing demand for effective confidentiality of digital data, application software and systems for use with electronic products are always capable of configuring data confidentiality. According to the prior art, the display of confidential data is preceded by a prompt, such as "To display confidential data, enter a password: _____," alerting the user that the data intended to be displayed is confidential. However, the aforesaid configuration process unequivocally declares that the data displayed here is encrypted and therefore draws people's attention to the data, thereby increasing the likelihood that unauthorized persons will crack and steal the data.

Accordingly, it is imperative for a user to hide data so thoroughly that the hidden data is not perceivable to the other users, decrypt the data unrevealingly and efficiently, and effectuate a decryption method in diverse ways by hardware, software and equipment so as to enhance data confidentiality.

SUMMARY OF THE INVENTION

To overcome the aforesaid drawbacks of the prior art and meet the aforesaid needs, the present invention provides a decryption method for use in displaying data. The steps of the process flow of the decryption method for use in displaying data are described below.

In an embodiment, the decryption method for use in displaying data comprises the steps of: executing a display instruction of an object, wherein the object comprises a plurality of data; displaying an unencrypted data, but not an encrypted data, of the data on a display unit according to the display instruction; detecting a trigger signal during a state of displaying the unencrypted data but not displaying the encrypted data; entering a password-receiving state in response to the trigger signal and detecting a password signal during the password-receiving state; determining whether the password signal matches a default password; and displaying the unencrypted data and the encrypted data on the display unit when the password signal matches the default password. As indicated above, before a trigger signal is detected, the display unit does not display any prompt or hint, and in consequence no display unit user other than the object owner is aware of the encrypted data.

In another embodiment, the step of displaying an unencrypted data, but not an encrypted data, of the data on a display unit according to the display instruction comprises: detecting an encryption state of each said data to confirm whether the data is the encrypted data or the unencrypted data; and displaying the unencrypted data, but not the encrypted data, on the display unit. Therefore, the display unit does not display any encrypted data, thereby enhancing confidentiality.

In another embodiment, an object is a spreadsheet, a folder, a message transmission interface, a schedule calendar, a directory or a conversation record interface. The data comprises a plurality of form fields, cells, a plurality of files, a plurality of messages, a plurality of schedule calendar items, a plurality of contact-related information or a plurality of conversation records. Various application interfaces are applicable to a wide variety of data formats.

In another embodiment, the trigger signal is generated by a physical key. Alternatively, the trigger signal is generated by a fingerprint recognizer. It is only when an object owner presses a physical key or only when confirmed by the fingerprint recognizer that subsequent decryption steps begin.

In another embodiment, the display unit is a touch panel, and the step of detecting a trigger signal during a state of displaying the unencrypted data but not displaying the encrypted data comprises detecting a specified region of the touch panel during a state of displaying the unencrypted data but not displaying the encrypted data to confirm whether the specified region generates the trigger signal. It is only when the object owner touches a specified region of the touch panel to generate a trigger signal that subsequent decryption steps begin.

In another embodiment, the area of the specified region is smaller than a sensing area of the touch panel. The appropriate reduction in the area of the specified region prevents persons other than the object owner from touching the specified region inadvertently and prevents subsequent decryption steps from being begun inadvertently.

In another embodiment, the step of entering a password-receiving state in response to the trigger signal and detecting a password signal during the password-receiving state comprises receiving a track signal by the touch panel in response to the trigger signal. The object owner draws a specific track on the touch panel so as to generate the track signal and thereby finish subsequent decryption steps. Furthermore, the trigger signal is configured to function as the first tracking point of the track signal so as to prevent the persons other than the object owner from touching the touch panel inadvertently and beginning subsequent decryption steps inadvertently.

In another embodiment, the step of entering a password-receiving state in response to the trigger signal and detecting a password signal during the password-receiving state comprises: displaying an entry field on the display unit in response to the trigger signal; and receiving the password signal by the entry field. Furthermore, the password signal comprises a letter, a digit, a symbol, or a combination thereof. The object owner touches a specified region of the touch panel to generate a trigger signal, then enter a password-receiving state, and finally finish decryption with the input password signal.

In another embodiment, the step of entering a password-receiving state in response to the trigger signal and detecting a password signal during the password-receiving state comprises: starting a sound receiving device in response to the trigger signal; and receiving by the sound receiving device a sound frequency for use as the password signal. Diversity of the password signal caters for diverse user needs.

In another embodiment, in the step of receiving by the sound receiving device a sound frequency for use as the password signal, the sound receiving device receives the sound frequency according to a length of time the generated trigger signal persists. The user's finger must touch a specified region of the touch panel continuously in order to ensure that the sound receiving device will function well. Therefore, the present invention prevents persons other than an encryption undertaker from touching the specified region of the touch panel inadvertently and beginning subsequent decryption steps inadvertently.

In another embodiment, the step of entering a password-receiving state in response to the trigger signal and detecting a password signal during the password-receiving state comprises: starting a picture taking device in response to the trigger signal; and receiving by the picture taking device an image for use as the password signal. With an image being used as the password signal, another diverse way of implementing the password signal is provided.

In another embodiment, the step of entering a password-receiving state in response to the trigger signal and detecting a password signal during the password-receiving state comprises: starting a fingerprint recognizer in response to the trigger signal; and sensing a fingerprint signal with the fingerprint recognizer and using the fingerprint signal as the password signal. With a fingerprint being used as the password signal, another diverse way of implementing the password signal is provided.

BRIEF DESCRIPTION OF THE DRAWINGS

FIG. 3 shows a display frame after encryption according to the first embodiment of the present invention;

FIG. 5 is a schematic view of the display unit operating in a password-receiving state according to the first embodiment of the present invention;

DETAILED DESCRIPTION OF THE EMBODIMENTS

Figure 1:
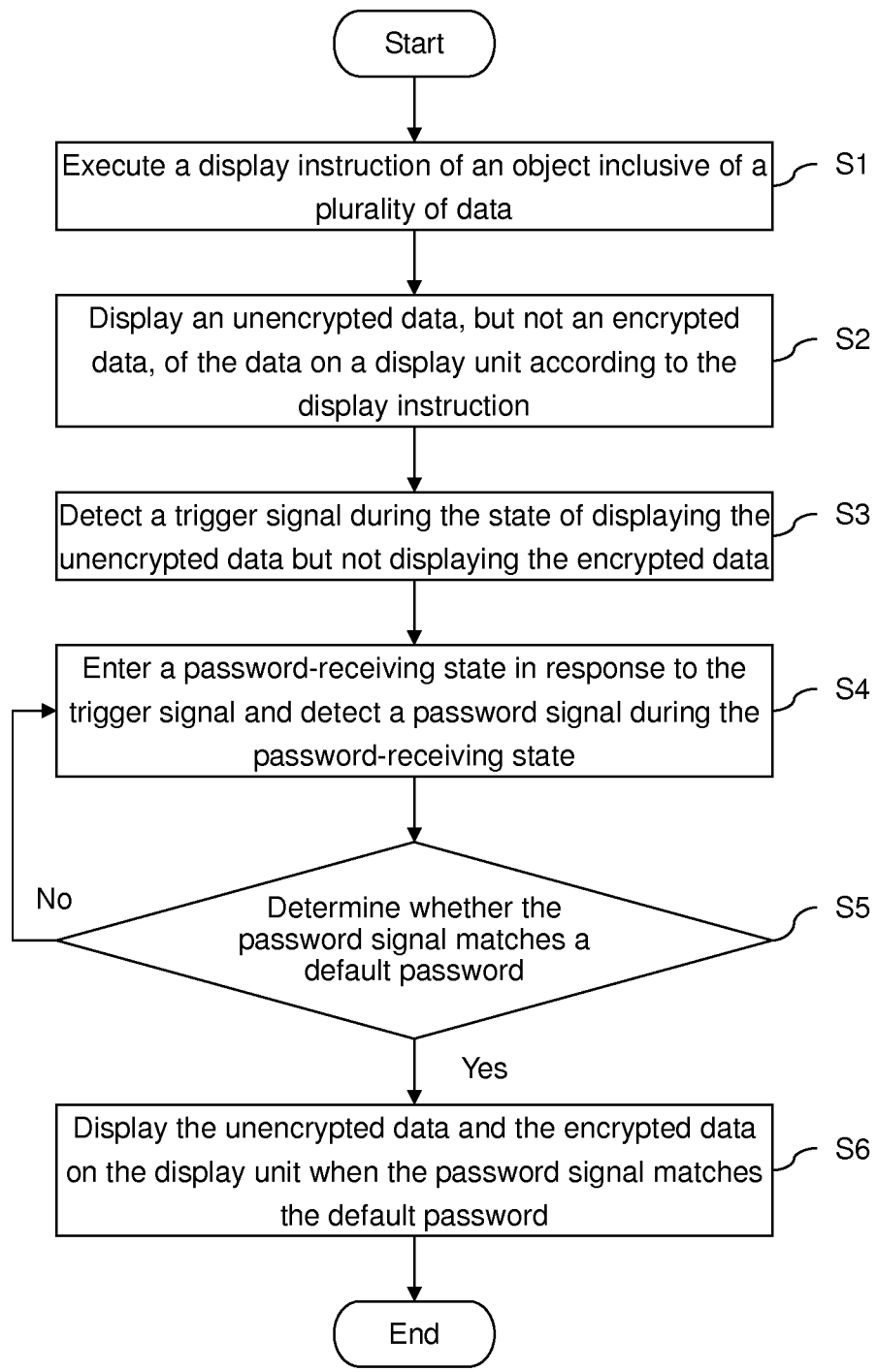
FIG. 1 is a flowchart of the process flow of a decryption method for use in displaying data according to an embodiment of the present invention.
Figure 2:
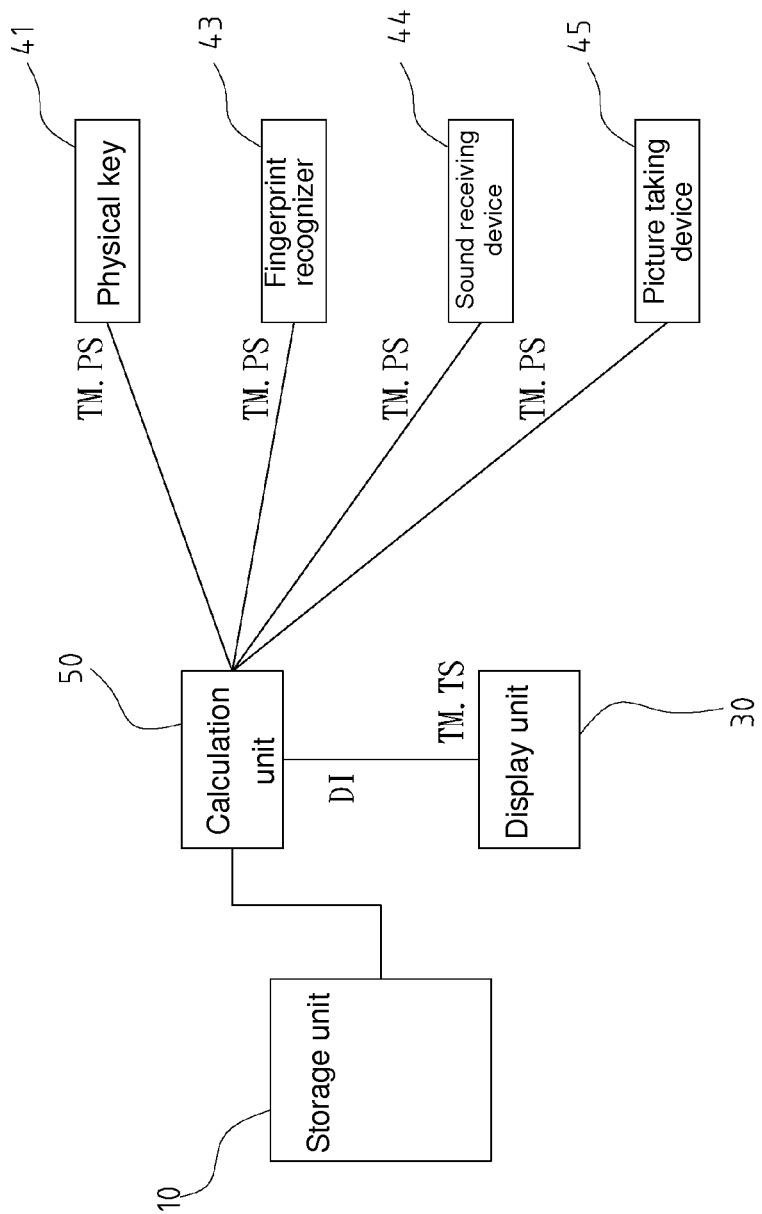
FIG. 2 is a schematic view of a system for use with the decryption method for use in displaying data according to an embodiment of the present invention.

FIG. 1 is a flowchart of the process flow of a decryption method for use in displaying data according to an embodiment of the present invention. FIG. 2 is a schematic view of an electronic device for use with the decryption method for use in displaying data according to an embodiment of the present invention. Referring to FIG. 1 and FIG. 2, the decryption method for use in displaying data comprises the steps of: executing a display instruction DI of an object 11 comprising a plurality of data 20 (step S1); displaying an unencrypted data 21, but not an encrypted data 22, of the data 20 on a display unit 30 according to the display instruction DI (step S2); detecting a trigger signal TM during the state of displaying the unencrypted data 21 but not displaying the encrypted data 22 (step S3); entering a password-receiving state in response to the trigger signal TM and detecting a password signal PS during the password-receiving state (step S4); determining whether the password signal PS matches a default password (step S5); and displaying the unencrypted data 21 and the encrypted data 22 on the display unit 30 when the password signal PS matches the default password (step S6).

Therefore, the decryption method for use in displaying data is applicable to an electronic device, and the electronic device comprises a calculation unit 50, a storage unit 10 and the display unit 30. Referring to FIG. 2, the calculation unit 50 processes the exchange and calculation of various information. The storage unit 10 stores therein an object 11 as well as the encrypted data 22 and the unencrypted data 21 of the object 11. The display unit 30 displays various data stored in the storage unit 10 according to the display instruction DI. The electronic device further comprises a wide variety of means of input (user interfaces), namely a physical key 41, a fingerprint recognizer 43, a sound receiving device 44 and a picture taking device 45, which collaborate with each other to effectuate decryption in embodiments described hereunder.

A decryption method for use in displaying data according to any one of the embodiments of the present invention can be implemented with a program product, provided that the program product is loaded to a computer (i.e., any electronic device equipped with the calculation unit 50, the storage unit 10 and the user interface and exemplified by a smartphone, a tablet, a handheld computer, and a desktop computer) and executed. In another embodiment, the program product is a computer-readable recording medium, whereas the program itself is stored in the computer-readable recording medium and loadable to a computer. In some embodiments, the program itself is a computer program product and can be transmitted to the computer in a wired or wireless way. In some embodiments, encryption and decryption can be effectuated by the hardware configuration of information products, thereby dispensing with any additional apparatus, as illustrated with the embodiments below.

In some embodiments, a program whereby the decryption method for use in displaying data according to the embodiments of the present invention is implemented can be integrated with various application software (such as an operating system of a computer, applications installed on a computer, and downloaded APP) to become a computer program product. Therefore, the object 11 is exemplified by a spreadsheet, a folder, a message transmission interface, a schedule calendar, a directory or a conversation record interface. The data 20 of the object 11 include a plurality of form fields, cells, a plurality of files, a plurality of messages, a plurality of schedule calendar items, a plurality of contact-related information or a plurality of conversation records. Given different systems or software interfaces, encryption and decryption can be effectuated with reference to each data format, as illustrated with the embodiments hereunder.

FIG. 3 shows a display frame after encryption according to the first embodiment of the present invention. Referring to FIG. 3, the display frame results from the execution of steps S1~S2 and shows that the display unit 30 is provided in the form of a tablet and that the calculation unit 50 sends the display instruction DI for opening the object 11 exemplified by a form. The object 11 exemplified by a form displays a plurality of data 20, and the plurality of data 20 corresponds to a plurality of form fields. Referring to FIG. 3, the object 11 exemplified by a form comprises three form fields, namely Full Name, Date of Birth, and Address, such that the plurality of data 20 is entered to the three form fields, namely Full Name, Date of Birth, and Address, respectively. Before the trigger signal TM is detected, the display unit 30 does not display any prompt or hint but visually presents only a normal form which has only three rows. All the users of the display unit 30 are unaware of the encrypted data, except an encryption undertaker.

Figure 4:
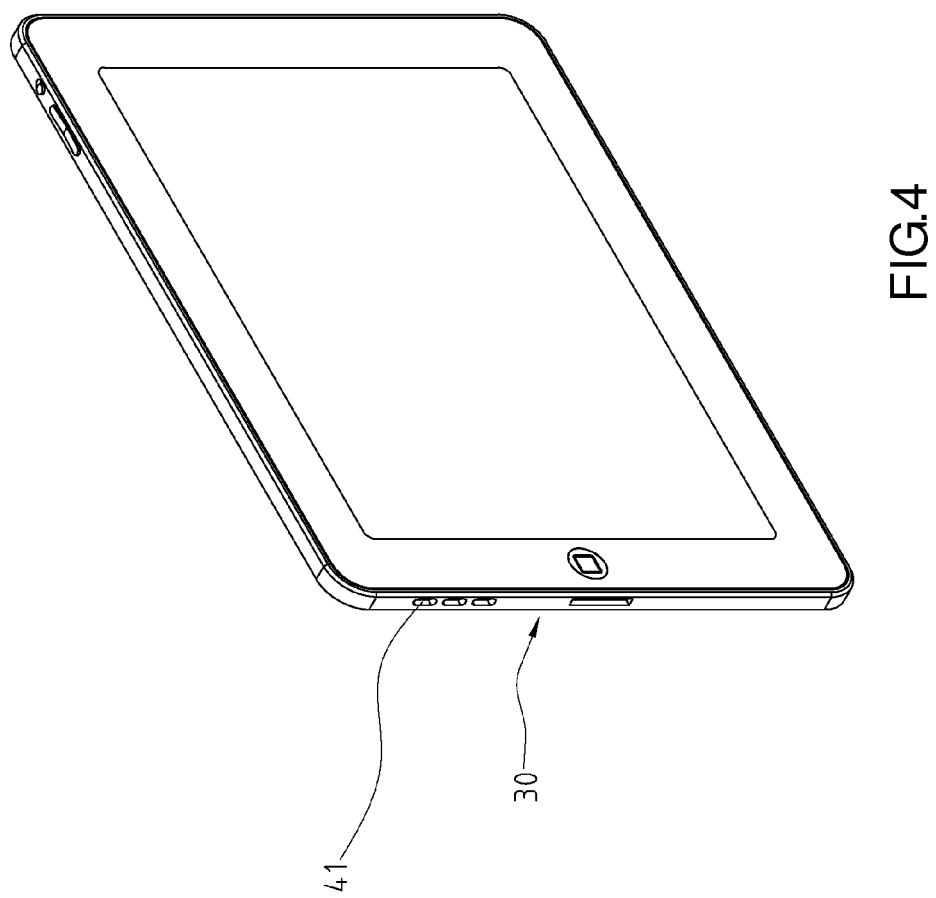
FIG. 4 is a lateral view of a display unit according to the first embodiment of the present invention.

FIG. 4 is a lateral view of a display unit according to the first embodiment of the present invention. Referring to FIG. 4, to access hidden information, the encryption undertaker starts the trigger signal TM. In this embodiment, the trigger signal TM is generated by a physical key 41 (such as an audio amplifying button on one side of a tablet). Alternatively, the encryption undertaker performs encryption configuration to select any other physical key. A user presses the physical key 41 to generate the trigger signal TM, and the entry into the password-receiving state occurs upon detection of the trigger signal TM. It is only when the entry into the password-receiving state occurs that instructions or messages thereafter received are regarded as the password signal PS. Therefore, in the situation where the password-receiving state does not exist, no instruction or message received is the password signal PS.

FIG. 5 is a schematic view of the display unit operating in a password-receiving state according to the first embodiment of the present invention. Referring to FIG. 5, the display frame results from the execution of steps S3~S4. In this embodiment, step S4 further comprises step S4-1 which involves displaying an entry field 42 on the display unit 30 in response to the trigger signal TM, and receiving the password signal PS by the entry field 42, wherein the password signal PS comprises a letter, a digit, a symbol, or a combination thereof. Therefore, before the trigger signal TM is detected, the frame does not present any prompt for receiving the password signal PS, and in consequence no unauthorized person is aware that the object 11 comprises the encrypted data 22.

Figure 6:
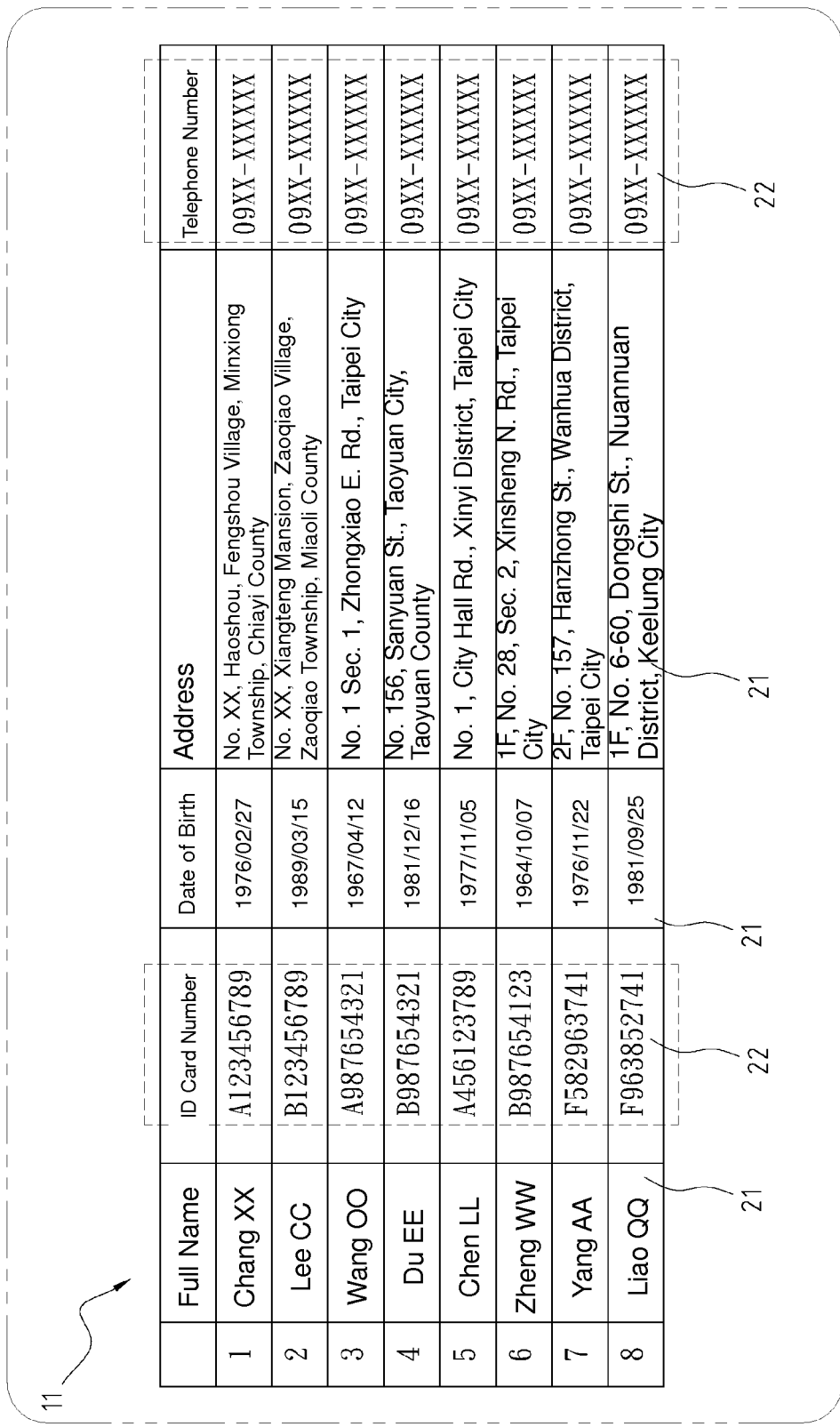
FIG. 6 shows a display frame after decryption according to the first embodiment of the present invention.

FIG. 6 shows a display frame after decryption according to the first embodiment of the present invention. Referring to FIG. 6, the encrypted data 22 in the object 11 comprises two form fields, namely ID Card Number and Telephone Number, and their respective data, which are displayed as soon as the password signal PS is entered, so as to be accessed by a decryption undertaker (whose is usually the encryption undertaker too).

Figure 7:
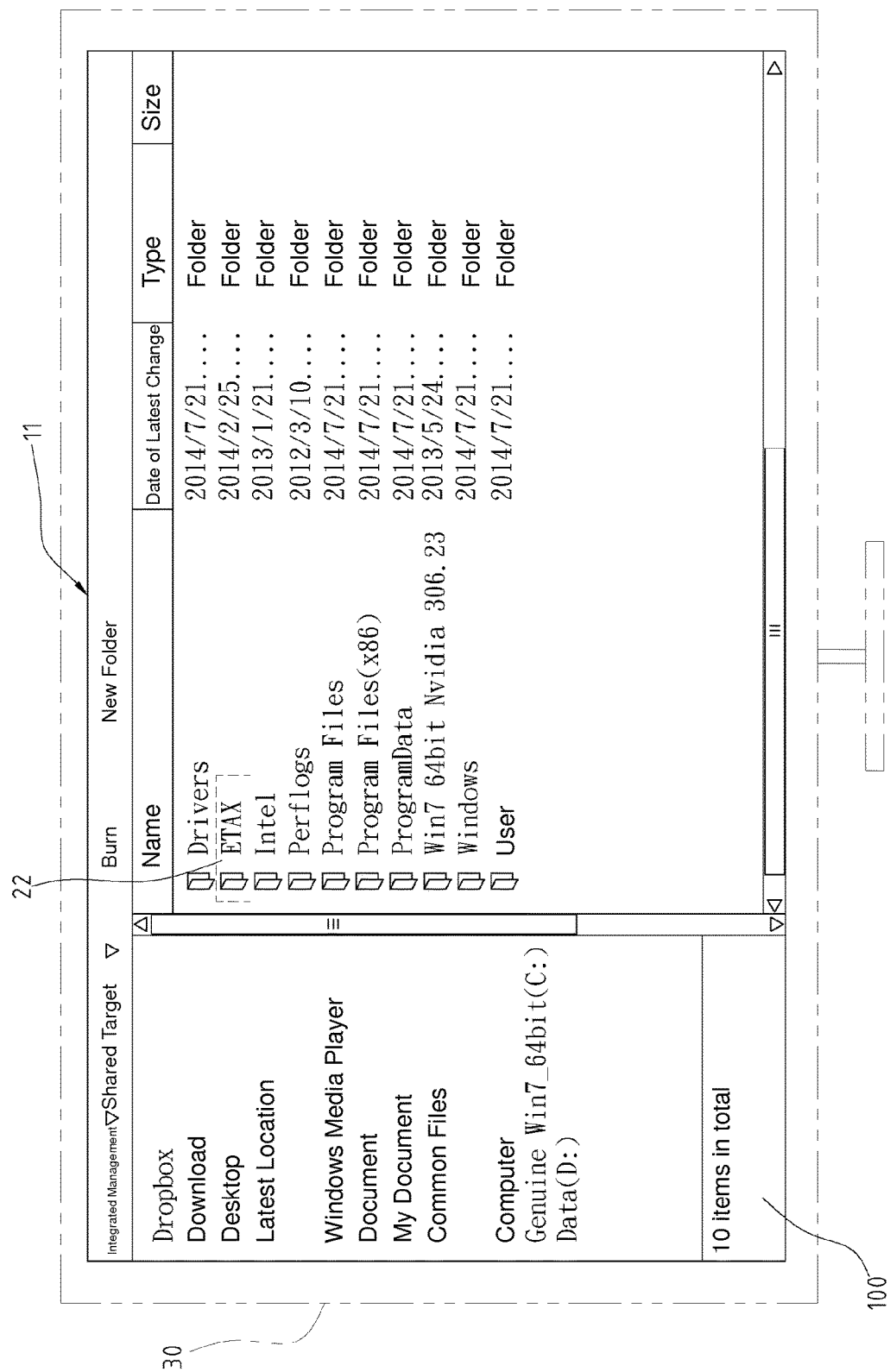
FIG. 7 shows a display frame before encryption according to the second embodiment of the present invention.
Figure 8:
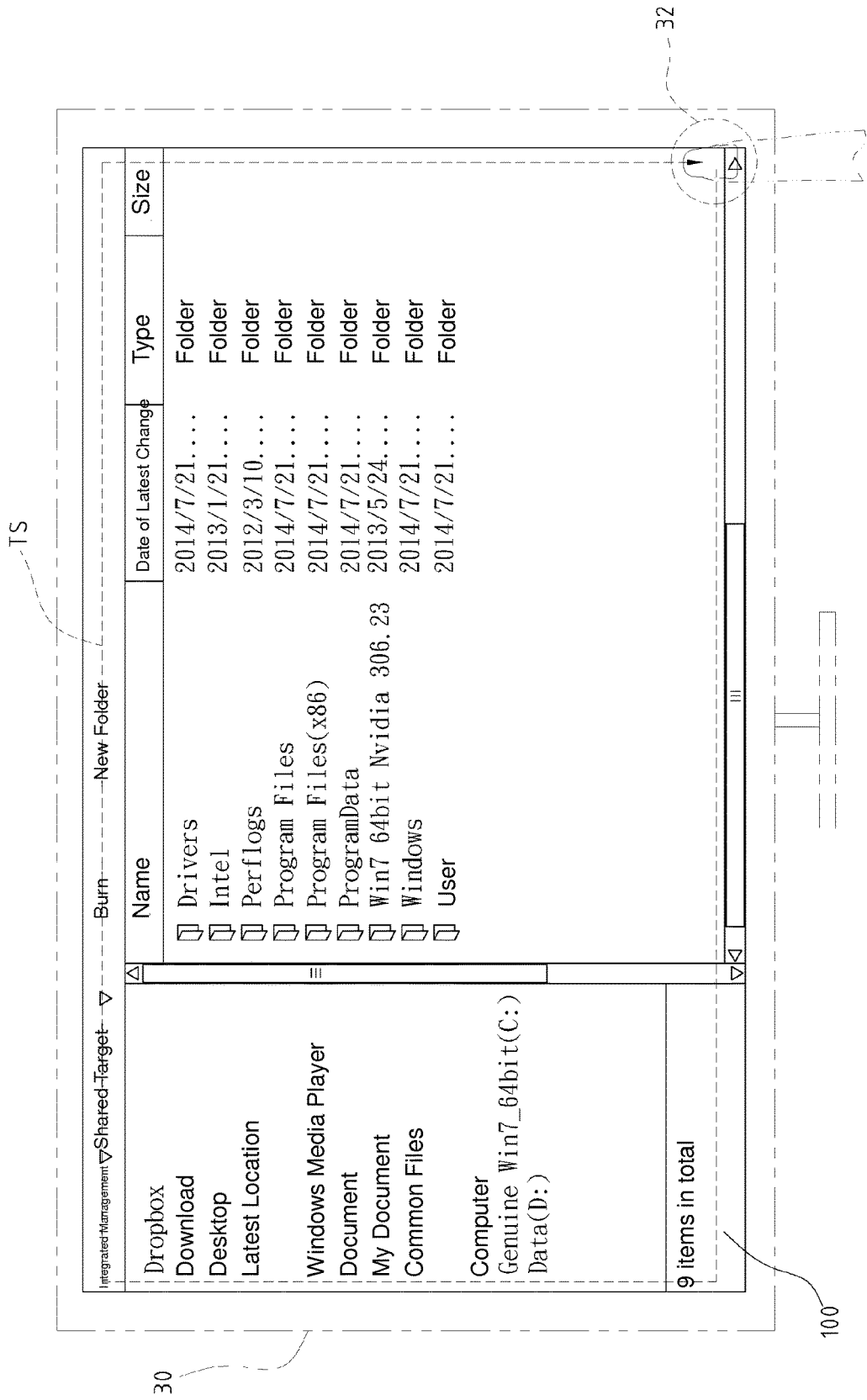
FIG. 8 shows a display frame after encryption according to the second embodiment of the present invention.

FIG. 7 shows a display frame before encryption according to the second embodiment of the present invention. Referring to FIG. 7, the display unit 30 displays the object 11, and the object 11 is an opened folder and comprises 10 files as indicated by the words "10 items in total" shown in a message block 100 at the lower left corner of the display frame. Afterward, a file (such as ETAX) selected from the 10 files is configured to be the encrypted data 22 by the encryption undertaker. FIG. 8 shows a display frame after encryption according to the second embodiment of the present invention. Referring to FIG. 8, not only is the file ETAX invisible in the folder, but the message block 100 also shows the words "9 items in total." Therefore, the encrypted data 22 is not taken into account whenever the calculation unit 50 gives the display instruction DI, and in consequence no user other than the encryption undertaker is aware of any abnormality or hidden information on the display unit 30, thereby achieving full confidentiality.

Similarly, regarding the decryption method for use in displaying data in the second embodiment, step S2 further comprises step S2-1 which involves detecting an encryption state of each data 20 to confirm whether the data is the encrypted data 22 or the unencrypted data 21, and step S2-2 which involves displaying the unencrypted data 21, but not the encrypted data 22, on the display unit 30. Therefore, in the situation where the object 11 is configured to contain therein the encrypted data 22, the object 11 displays only the unencrypted data 21 whenever opened.

Referring to FIG. 8, to access hidden information, the user starts the trigger signal TM. In this embodiment, the display unit 30 is a touch panel, and the user touches a specified region 32 of the touch panel to access the trigger signal TM. Therefore, according to the present invention, step S3 further comprises step S3-1 which involves detecting the specified region 32 of the touch panel in the state of displaying the unencrypted data 21 but not displaying the encrypted data 22 to thereby confirm whether the specified region 32 generates the trigger signal TM.

The specified region 32 is any region of the touch panel or is specified by the encryption undertaker. The area of the specified region 32 is typically smaller than a sensing area of the touch panel and can be specified by the encryption undertaker. In this embodiment, the specified region 32 is defined by a circular dashed line at the lower right corner of the display frame and adapted to generate the trigger signal TM when touched by the decryption undertaker's finger.

Although step S4-1 requires inputting the password signal PS, the present invention is not limited thereto. In this embodiment, step S4 further comprises step S4-2 which involves receiving a track signal TS by the touch panel in response to the trigger signal TM. For example, the user draws a square track on the touch panel to generate the track signal TS. To prevent users from touching the touch panel inadvertently and therefore opening encrypted data, it is practicable to see the trigger signal TM as the first tracking point of the track signal TS and therefore effectively reduce the chance of opening data inadvertently. In this embodiment, after being touched by the user's finger, the specified region 32 of the touch panel generates the trigger signal TM, and the user starts to draw a square track on the touch panel from the touching point of the specified region 32, such that the encrypted data 22 is displayed as soon as the track signal TS is generated.

Figure 9:
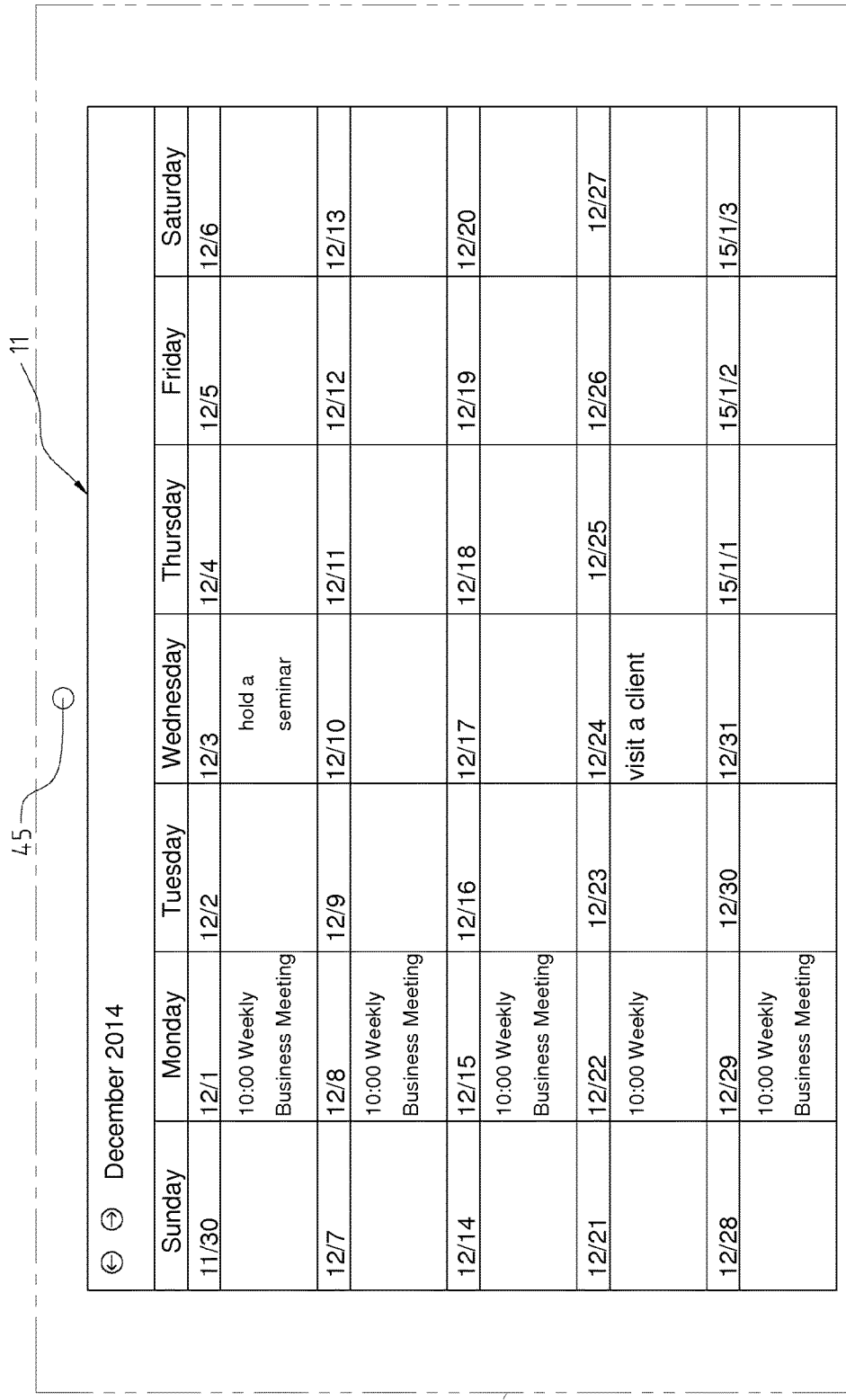
FIG. 9 shows a display frame after encryption according to the third embodiment of the present invention.

FIG. 9 shows a display frame after encryption according to the third embodiment of the present invention. Referring to FIG. 9, the display frame result from the execution of steps S1~S2 and shows that the display unit 30 is provided in the form of a desktop computer and that the object 11 opened by the user is a picture of a schedule calendar. The schedule calendar shows a plurality of data 20 pertaining to a plurality of schedule calendar items, such as various meeting-related information or dating dates. As shown in FIG. 9, before the trigger signal TM is detected, the display unit 30 does not display any prompt or hint but visually presents only a normal schedule calendar frame. All the users of the display unit 30 can see "business meetings held on Mondays," "a seminar held on December 3" and "a visit to client on December 24" only except the encryption undertaker.

In the third embodiment of the decryption method for use in displaying data, step S4 further comprises step S4-3 which involves starting the picture taking device 45 in response to the trigger signal TM and receiving by the picture taking device 45 an image for use as the password signal PS. The trigger signal TM is turned on and turned off by hardware or software, but the present invention is not limited thereto. An image recognition technique applies to the decryption method of the present invention. The process flow of the decryption method for use in displaying data according to the present invention goes to step S6 when the image (the password signal PS) received by the picture taking device 45 matches a default image (default password). In this embodiment, the picture taking device 45 receives the image according to the length of time the generated trigger signal TM persists, but the present invention is not limited thereto.

Figure 10:
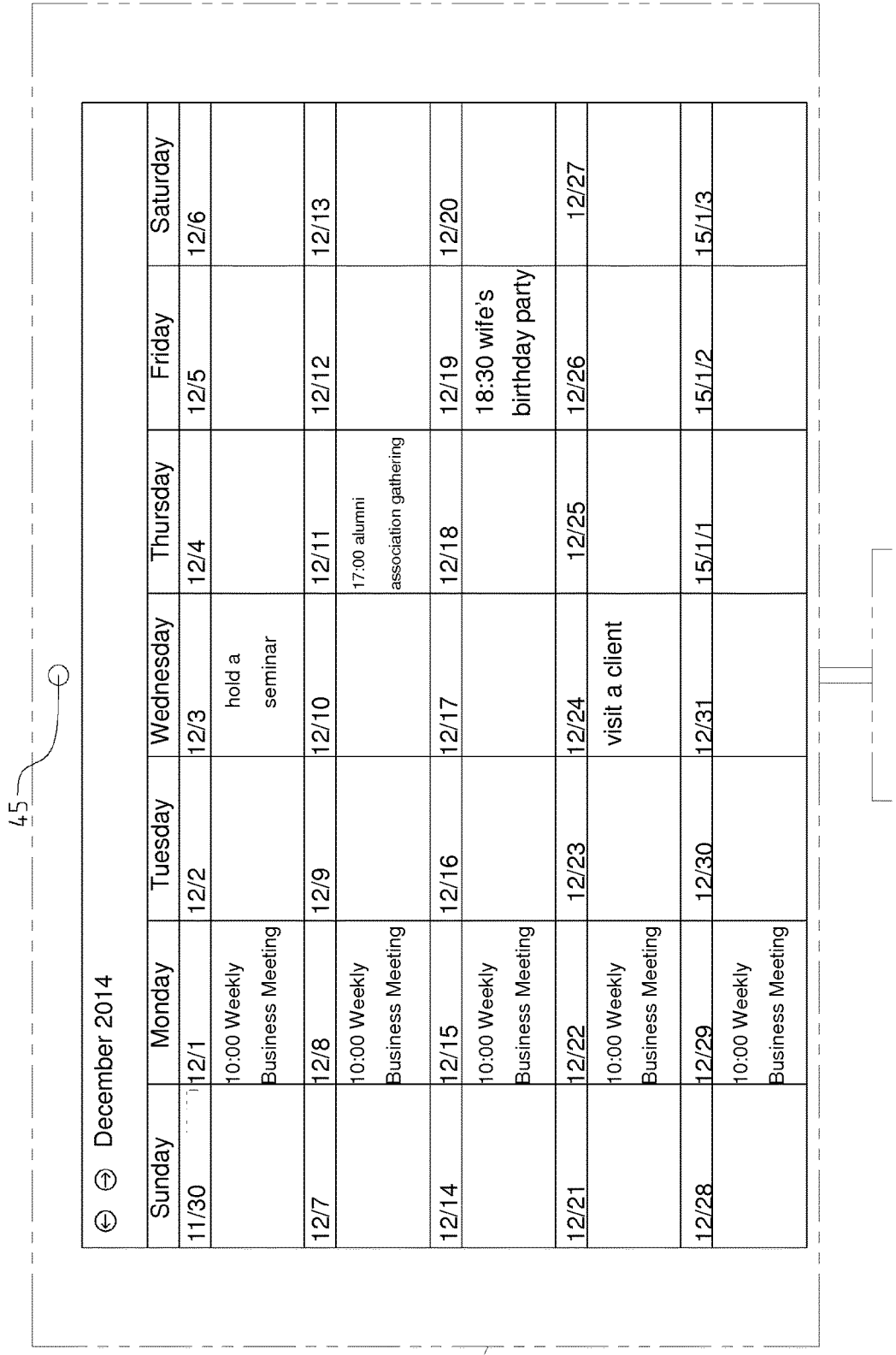
FIG. 10 shows a display frame after decryption according to the third embodiment of the present invention.

FIG. 10 shows a display frame after decryption according to the third embodiment of the present invention. Referring to FIG. 10, when step S6 is done, all data are displayed, including two pieces of encrypted data 22, namely "alumni association gathering held at 7:00 pm, December 11," and "my wife's birthday party held at 6:30 pm, December 19," which are displayed on the display unit 30.

Figure 11:
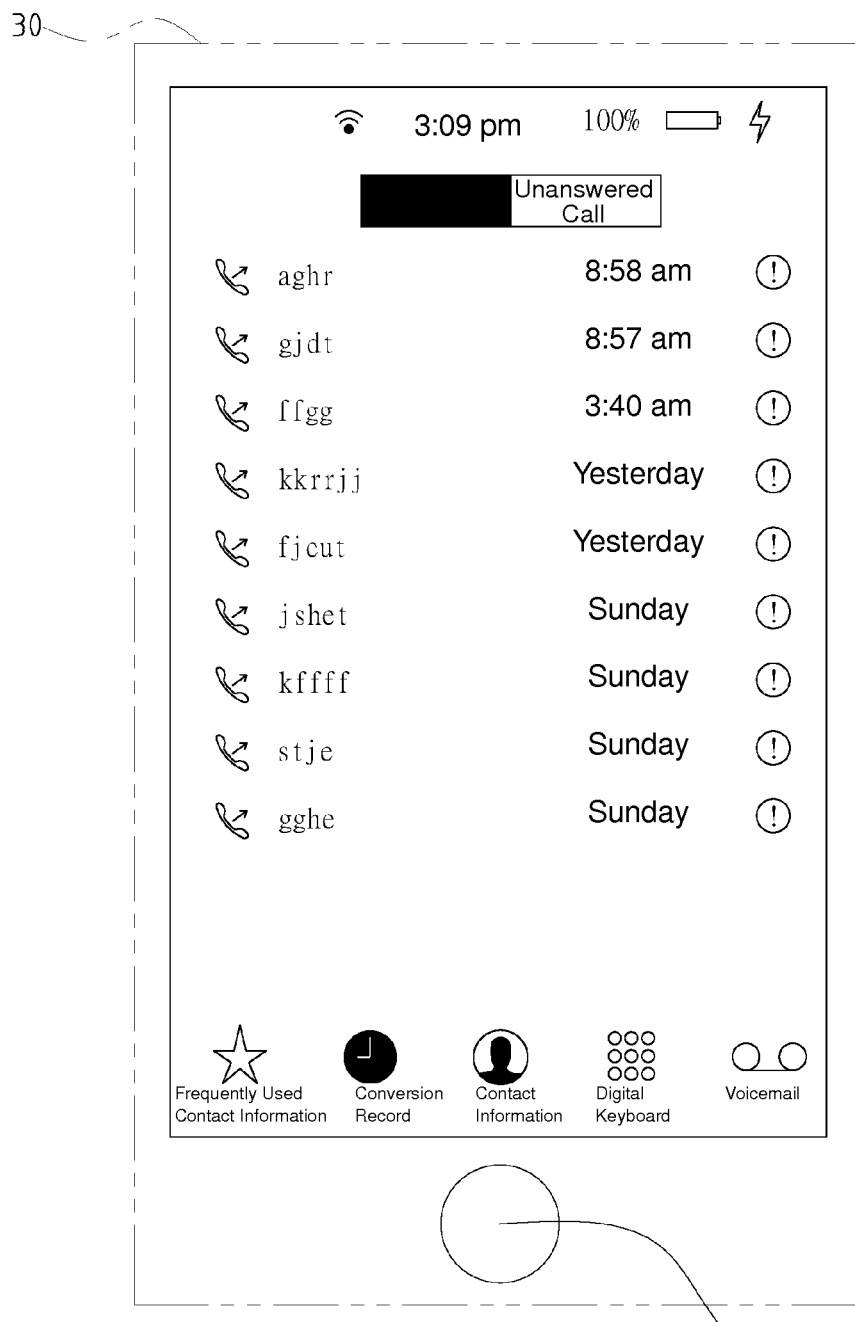
FIG. 11 shows a display frame after encryption according to the fourth embodiment of the present invention.

FIG. 11 shows a display frame after encryption according to the fourth embodiment of the present invention. Referring to FIG. 11, the display frame results from the execution of steps S1~S2 and shows schematically the display unit 30 provided in the form of a smartphone, wherein the object 11 opened by the user is a conversation record interface. The conversation record interface displays therein a plurality of data 20. In this embodiment, a plurality of data 20 is about the record of the ninth unanswered call. As indicated by FIG. 11, until and unless the trigger signal TM is detected, no prompt or hint will be displayed on the display unit 30, and therefore only a functioning conversation record interface which has the record of the ninth unanswered call is presented visually. All the users of the display unit 30 are unaware of the encrypted data, except the encryption undertaker.

To access hidden information, the encryption undertaker starts the trigger signal TM. In the fourth embodiment of the present invention, the trigger signal TM is either generated in the aforesaid embodiments or generated by the fingerprint recognizer 43. Therefore, the trigger signal TM either differs from or equals the password signal PS in the way they are generated. In the fourth embodiment of the present invention, step S4 further comprises step S4-4 which involves: starting the fingerprint recognizer 43 in response to the trigger signal TM; and sensing by the fingerprint recognizer 43 a fingerprint signal for use as the password signal PS.

Figure 12:
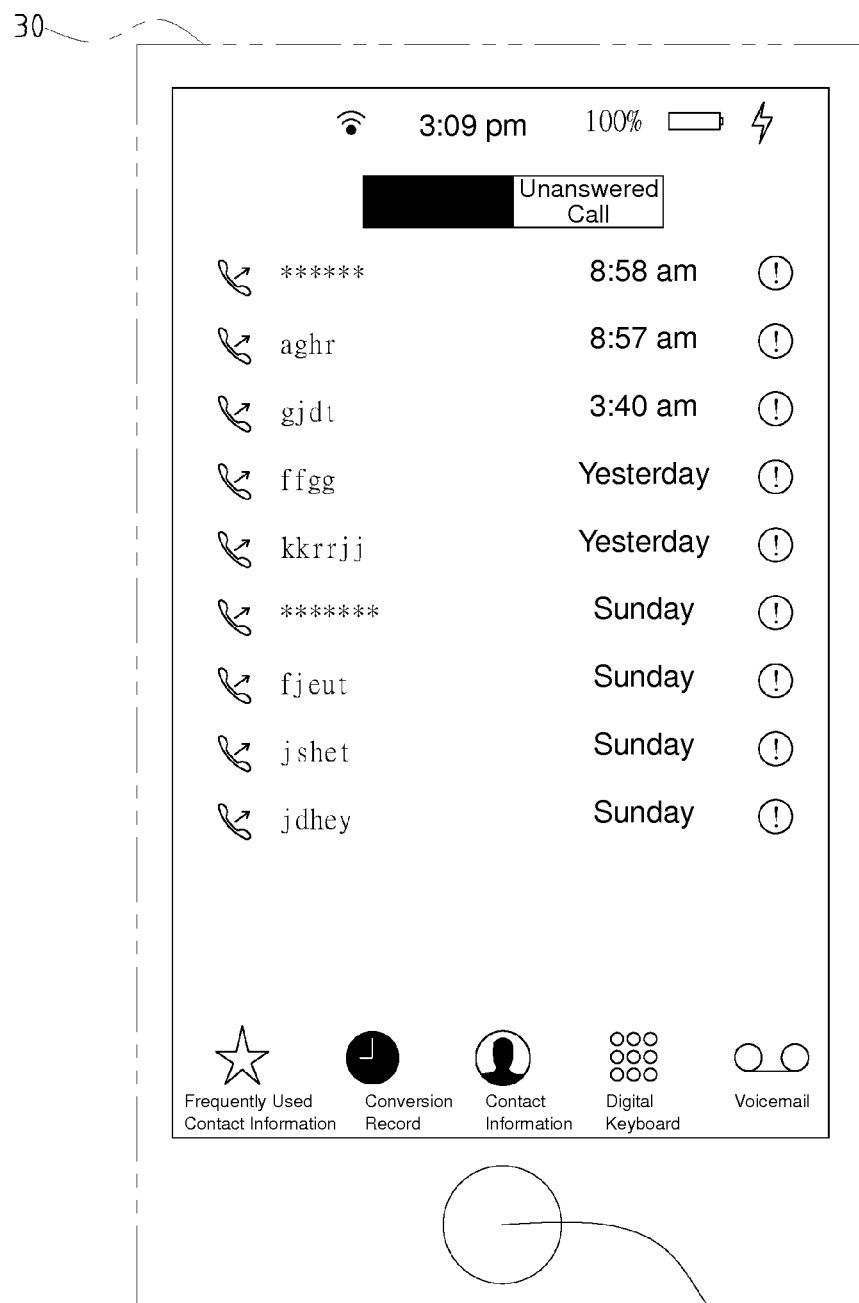
FIG. 12 shows a display frame after decryption according to the fourth embodiment of the present invention.

The process flow of the decryption method for use in displaying data according to the present invention goes to step S6 when a fingerprint (the password signal PS) received by the fingerprint recognizer 43 matches a default fingerprint (default password). Referring to FIG. 12, all the data are displayed, including two pieces of encrypted data 22, namely "****" and "****", posted at 9:29 am and on yesterday, respectively, on the display unit 30. The display frame shows the record of 9 unanswered calls each time as usual.

In a variant embodiment, step S4 further comprises step S4-5 which involves starting a sound receiving device in response to the trigger signal TM and receiving by the sound receiving device a sound frequency for use as the password signal PS, and step S4-5 further comprises step S4-6 which involves receiving a sound frequency by the sound receiving device according to the length of time the generated trigger signal TM persists. For example, in step S4-5 and step S4-6, which follow step S3-1, when the decryption undertaker's finger touches the specified region 32 on a touch screen continuously and thereby generates the trigger signal TM continuously, only a sound frequency received during a continuous period of time can be used as the password signal PS. Therefore, any sound frequency which is received not during the continuous period of time is not regarded as the password signal PS. In doing so, the present invention prevents information from being opened inadvertently and ensures that confidential information will be fully protected.

Accordingly, the sequence in which the steps of the decryption method for use in displaying data according to the present invention occur is subject to variation. For example, step S4 demonstrates high variability in a manner that step S4 further comprises any one of step S4-1, step S4-2, step S4-3, step S4-4 and step S4-5 for the sake of decryption. Furthermore, two or more decryption steps work together with a view to upgrading confidentiality level and rendering decryption more difficult.

Although the present invention is disclosed above by embodiments, the embodiments are not restrictive of the present invention. Any persons skilled in the art can make some changes and modifications to the embodiments without departing from the spirit and scope of the present invention. Accordingly, the legal protection for the present invention should be defined by the appended claims.

What is claimed is:

1. A decryption method for use in displaying data, the method comprising the steps of:
   executing a display instruction of an object, wherein the object comprises a plurality of data;
   displaying an unencrypted data of the data and hiding an encrypted data of the data from displaying without indication of an encryption status and presence of the encrypted data on a display unit according to the display instruction;
   detecting a trigger signal during a state of displaying the unencrypted data and hiding the encrypted data from displaying without indication of the encryption status and presence of the encrypted data on the display unit, wherein the detecting the trigger signal comprises detecting a region of a touch panel to confirm whether the region generates the trigger signal, wherein the region is smaller than a sensing area of the touch panel and is defined by a circular dashed line at the lower right corner of a display frame and adapted to generate the trigger signal when touched by a decryption undertaker's finger;
   entering a password-receiving state in response to the trigger signal and detecting a password signal during the password-receiving state, wherein the entering the password-receiving state comprises receiving a track signal according to a track drawn by a user on the touch panel in response to the trigger signal;
   determining whether the password signal matches a default password; and
   displaying the unencrypted data and the encrypted data on the display unit when the track signal is generated.

2. The decryption method for use in displaying data of claim 1, wherein the step of displaying an unencrypted data of the data and hiding an encrypted data of the data from displaying without indication of an encryption status and presence of the encrypted data on a display unit according to the display instruction comprises:

detecting an encryption state of each said data to confirm whether the data is the encrypted data or the unencrypted data; and displaying the unencrypted data and hiding the encrypted data of the data from displaying without indication of the encryption status and presence of the encrypted data on the display unit.

3. The decryption method for use in displaying data of claim 1, wherein the object is one of a spreadsheet, a folder, a message transmission interface, a schedule calendar, a directory and a conversation record interface.

4. The decryption method for use in displaying data of claim 1, wherein the data comprises a plurality of form fields, cells, a plurality of files, a plurality of messages, a plurality of schedule calendar items, a plurality of contact-related information or a plurality of conversation records.

5. The decryption method for use in displaying data of claim 1, wherein the trigger signal is generated by a physical key.

6. The decryption method for use in displaying data of claim 1, wherein the trigger signal is generated by a fingerprint recognizer.

7. The decryption method for use in displaying data of claim 1, wherein the display unit is a touch panel, and the step of detecting a trigger signal during a state of displaying the unencrypted data and hiding the encrypted data from displaying without indication of the encryption status and presence of the encrypted data comprises detecting the region of the touch panel during a state of displaying the unencrypted data and hiding the encrypted data from displaying without indication of the encryption status and presence of the encrypted data to confirm whether the region generates the trigger signal.

8. The decryption method for use in displaying data of claim 6, wherein the step of entering a password-receiving state in response to the trigger signal and detecting a password signal during the password-receiving state comprises receiving the track signal by the touch panel in response to the trigger signal.

9. The decryption method for use in displaying data of claim 7, wherein the trigger signal is a first tracking point of the track signal.

10. The decryption method for use in displaying data of claim 1, wherein the step of entering a password-receiving state in response to the trigger signal and detecting a password signal during the password-receiving state comprises:

displaying an entry field on the display unit in response to the trigger signal; and receiving the password signal by the entry field.

11. The decryption method for use in displaying data of claim 10, wherein the password signal comprises a letter, a digit, a symbol, or a combination thereof.

12. The decryption method for use in displaying data of claim 1, wherein the step of entering a password-receiving state in response to the trigger signal and detecting a password signal during the password-receiving state comprises:

starting a sound receiving device in response to the trigger signal; and receiving by the sound receiving device a sound frequency for use as the password signal.

13. The decryption method for use in displaying data of claim 12, wherein, in the step of receiving by the sound receiving device a sound frequency for use as the password signal, the sound receiving device receives the sound frequency according to a length of time the generated trigger signal persists.

14. The decryption method for use in displaying data of claim 1, wherein the step of entering a password-receiving state in response to the trigger signal and detecting a password signal during the password-receiving state comprises:

starting a picture taking device in response to the trigger signal; and receiving by the picture taking device an image for use as the password signal.

15. The decryption method for use in displaying data of claim 14, wherein, in the step of receiving by the picture taking device an image for use as the password signal, the picture taking device receives the image according to a length of time the generated trigger signal persists.

16. The decryption method for use in displaying data of claim 1, wherein the step of entering a password-receiving state in response to the trigger signal and detecting a password signal during the password-receiving state comprises:

starting a fingerprint recognizer in response to the trigger signal; and sensing a fingerprint signal with the fingerprint recognizer and using the fingerprint signal as the password signal.

17. The decryption method for use in displaying data of claim 1, wherein the track is square.

* * * * *